G. T. PALMER.
Water Cooler.
No. 56,792.
2 Sheets—Sheet 1.
Patented July 31, 1866.
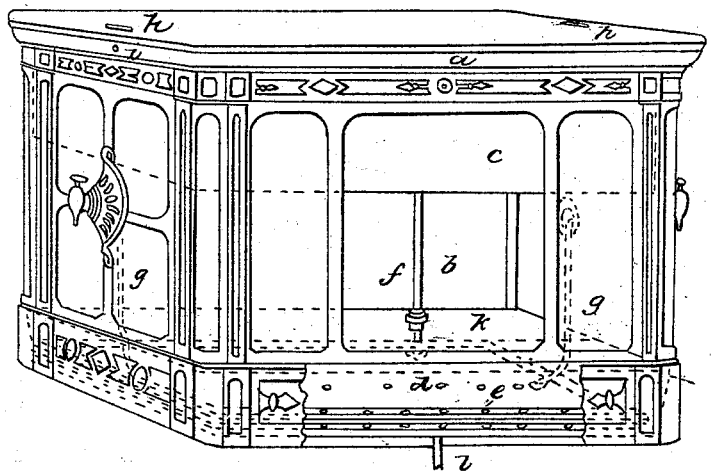
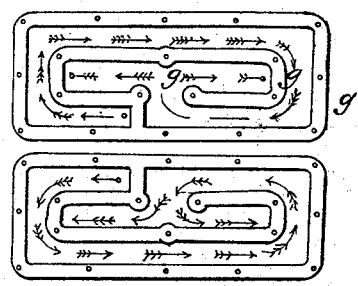
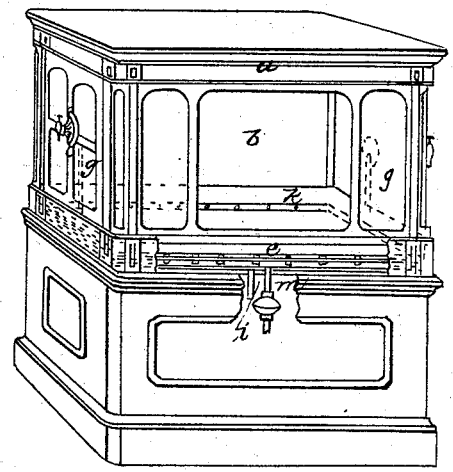

G. T. PALMER.
Water Cooler.
No. 56,792.
2 Sheets—Sheet 2.
Patented July 31, 1866.
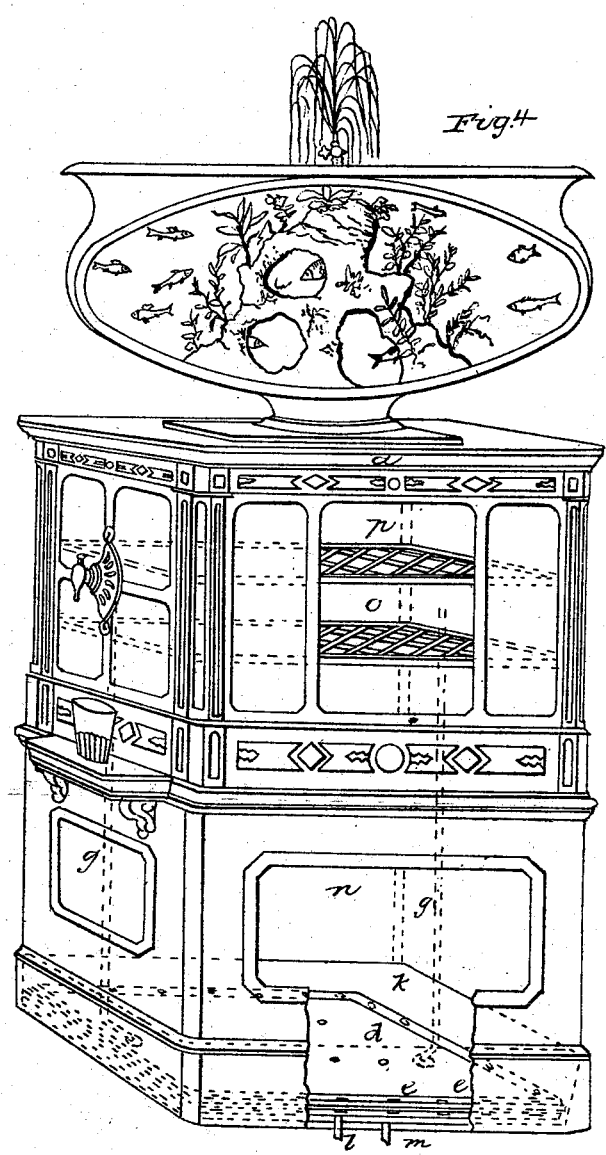

UNITED STATES PATENT OFFICE.

GEO. T. PALMER, OF BROOKLYN, NEW YORK.

IMPROVEMENT IN WATER-COOLERS.

Specification forming part of Letters Patent No. 56,792, dated July 31, 1866; antedated July 20, 1866.

*To all whom it may concern:*

Be it known that I, GEO. T. PALMER, of Brooklyn, in the county of Kings and State of New York, have invented a new Mode of Constructing Water-Coolers; and I do hereby declare that the following is a full and exact description thereof, reference being had to the accompanying drawings, and to the letters of reference marked thereon.

The same letters on the different drawings represent similar parts.

The nature of my invention consists in constructing a pedestal water-cooler in the following manner, for use on counters, &c.:

Figure 1 is a perspective view of my pedestal water-cooler; Fig. 2, plates of the cooler, separated, to show its internal construction; Fig. 3, a modification of Fig. 1.

In Fig. 1, $a$ represents the outside case. $b$ is an opening, provided with a movable door; $c$, a vessel or reservoir for holding water, (indicated by blue lines;) $d$, an iron cooler, (indicated by red lines.) It is made of two plates and bolted together, as shown at $e\ e\ e$. $k$, a pan in which the cooler $d$ rests. It receives the water from the melted ice and passes it off through the waste-pipe $l$. $f$ is a pipe connecting the water-tank $c$ with the cooler $d$; $g\ g$, pipes connecting the cooler $d$ with the draft-faucets $n\ n$. $i$ is an opening leading from the water-tank $c$; $h\ h$, openings on the top of the case, through which the water-tank $c$ can be filled.

In Fig. 2, which represents the inside of the cooler $d$, $y\ y\ y$ are partitions controlling the course of the water through the cooler; $f'$, an opening to which the pipe $f$ is affixed; $g'\ g'$, openings to which the pipes $g\ g$ are attached. The cooler-plates are made of cast-iron and coated with vitrified enamel.

Fig. 3 shows a modification of Fig. 1, in which the water-tank $c$ is omitted, also the pipe $f$, and the pipe $m$ substituted, to furnish a supply of water to the cooler from outside the cooler-case.

The operation of my pedestal water-cooler can be readily understood. Water is supplied to the vessel or tank $c$ through the openings $h\ h$. Water passing through the opening $i$ will indicate that the tank is sufficiently full. A plug placed in the opening will stop the flow of the water through it. Ice is now conveyed through the opening $b$ to the inside of the cooler-case and placed on the top of the cooler $d$, which will cool the water contained therein. The faucets, which are placed a little below the line of the bottom of the water-tank $c$, being opened, the water will flow from the tank $c$ through the pipe $f$ to the cooler $d$ and circulate through the cooler, as shown by the red arrows in Fig. 2, thence through the pipes $g\ g$ to the faucets, which will deliver water as long as any remains in the tank $c$. The water from the melted ice passes off through the pipe $l$.

A grating of wood or other material may be placed upon the cooler to prevent the ice from melting more rapidly than is needed for the sufficient cooling of the water.

Among the advantages derived from making a water cooler as above described is, first, having a large cooler-surface exposed to the action of the ice; second, a large space for ice, which is more economical than where small quantities alone can be used; third, the ice in this cooler not being put into the water, a much less quantity is consumed, and an inferior quality may be used; fourth, the door to the ice-chamber being on the side of the cooler-case makes it more convenient to charge it with ice (as the cooler is always placed on a counter or other elevation) than if in the usual way of an opening at the top. It also allows the top of the case to be made use of for the purpose of supporting any article of ornament, thereby converting the cooler-case into a pedestal for such purpose, as it is not necessary to remove the top for ordinary use. Fifth, there being no necessity of removing the top, it is left free to serve as a pedestal, on which objects of ornament can be placed.

Having thus described my invention, I claim—

The reservoir $c$, cooler $d$, and pipes $g\ g$, combined and arranged substantially as and for the purpose shown and described.

GEO. T. PALMER.

Witnesses:
   JAS. PALMER,
   CHAS. E. FROST.